Patented Oct. 2, 1934

1,975,449

UNITED STATES PATENT OFFICE 1,975,449

PRODUCTION OF SODIUM SESQUICARBONATE AND SODIUM BICARBONATE

George Lewis Cunningham and Homer Louis Robson, Niagara Falls, N. Y., assignors to The Mathieson Alkali Works, Inc., New York, N. Y., a corporation of Virginia No Drawing. Application July 26, 1932, Serial No. 624,883

4 Claims. (Cl. 23—64)

This invention relates to improvements in the production of sodium sesquicarbonate, $NaHCO_3 \cdot Na_2CO_3 \cdot 2H_2O$ and sodium bicarbonate, $NaHCO_3$. This invention provides a modification of the conventional ammonia-soda process enabling the direct production of sodium sesquicarbonate as well as sodium bicarbonate.

According to the present invention, an ammoniacal aqueous solution of sodium chloride is carbonated, as in the conventional ammonia-soda process, but the carbonation is carried out in two steps in the first of which special conditions are maintained such that as much as 25% of the sodium chloride is recovered as sodium sesquicarbonate in the first step, sodium bicarbonate being recovered in the second step. According to this invention, an ammoniacal aqueous solution of sodium chloride containing upwards of 3.2 parts of $NH_3$ per 10 parts of $NaCl$ and substantially saturated with respect to $NaCl$ is carbonated to produce a reaction mixture from which sodium sesquicarbonate is precipitated, the precipitated sodium sesquicarbonate is separated from the mother liquor at a temperature not exceeding about 40° C., the mother liquor is then further carbonated to precipitate sodium bicarbonate, and the precipitated sodium bicarbonate is separated from this mother liquor. In the conventional ammonia-soda process as commonly practiced, the weight ratio of ammonia to sodium chloride in the brine subjected to carbonation is usually less than 3.2:10, or temperatures higher than 40° C., frequently as high as 50°–60° C., are attained during carbonation, or the brine is not maintained saturated with respect to sodium chloride. When these conditions prevail, sodium sesquicarbonate is not precipitated. In carrying out the present invention the weight ratio of ammonia to sodium chloride in the brine subjected to carbonation approximates, with advantage, from 3.2 to 7.0 parts (by weight) of $NH_3$ per 10 parts of $NaCl$. A ratio of about 4.4 parts of $NH_3$ per 10 parts of $NaCl$ is advantageous, particularly where the reaction, for the production of sodium sesquicarbonate, is completed at a temperature approximating 30° C. Following the first carbonation, to produce sodium sesquicarbonate, and before the second carbonation, to produce sodium bicarbonate, it is advantageous to bring the ammonia concentration of the mother liquor to a value such that the molecular ratio $NH_3:NH_3+Cl$ approximates 0.55, if a maximum recovery of sodium bicarbonate is to be secured. The precipitated sodium sesquicarbonate and sodium bicarbonate may be separated from the respective mother liquors in any convenient manner. The second carbonation, to produce sodium bicarbonate, may be carried out in the conventional manner.

The invention will be illustrated by the following specific examples:

I. 25.5 parts (by weight) of ammonia are added to a solution of 58.5 parts of sodium chloride in 167 parts of water, and this ammoniacal sodium chloride brine is then carbonated until the molecular ratio of carbon dioxide to free base, that is OH—equivalent, or in terms commonly used in connection with the conventional ammonia-soda process until the ratio of one-half the $CO_2$ titre to the free ammonia titre, in the mother liquor after separation of precipitated sodium sesquicarbonate reaches 0.343, the reaction mixture finally being brought to a temperature of about 30° C. 14.7 parts of sodium sesquicarbonate are precipitated and separated from the mother liquor, this recovery of sodium sesquicarbonate corresponding to a conversion of about 19.5% of the sodium chloride originally present in the brine. The mother liquor is then carbonated until the molecular ratio of carbon dioxide to free base reaches about 0.75, that is until ammonium bicarbonate just begins to precipitate. The precipitated sodium bicarbonate is separated from this mother liquor, the recovery of sodium bicarbonate corresponding to a conversion of about 50–53% of the sodium chloride originally present in the brine. The remaining mother liquor, containing ammonium chloride produced in the reactions, is subjected to conventional operations for the recovery of ammonia and carbon dioxide.

II. 39.7 parts of ammonia are added to an aqueous solution of 58.5 parts of sodium chloride in 121.5 parts of water, and this ammoniacal sodium chloride brine is then carbonated until the molecular ratio of carbon dioxide to free base reaches about 0.313, the reaction mixture finally being brought to a temperature of about 30° C. Sodium sesquicarbonate is precipitated and separated from the mother liquor, the recovery of sodium sesquicarbonate corresponding to a conversion of about 22.5% of the sodium chloride originally present in the brine. The ammonia concentration of this mother liquor is too high to permit a maximum recovery of sodium bicarbonate. This ammonia concentration is brought to a value such that the ratio $NH_3:NH_3+Cl$ approximates 0.55, for example, by the addition of a saturated aqueous solution of sodium chloride or by distillation of a part of the ammonia content from the mother liquor. The mother liquor is then carbonated to saturation. The precipitated sodium bicarbonate is separated from the mother liquor, the recovery of sodium bicarbonate corresponding to a conversion of about 52-58% of the sodium chloride originally present in the brine.

The carbonation to produce sodium sesquicarbonate, the first carbonation, need not be carried out at any particular temperature. The temperature of the reaction mixture should be brought to a value not exceeding about 40° C., however, before separation of sodium sesquicarbonate and a temperature not exceeding about 40° C. should be maintained during separation of sodium sesquicarbonate. That is, the sodium sesquicarbonate is separated from the mother liquor at a temperature not exceeding about 40° C., although the carbonation may be carried out at higher temperature.

The combined operation of the present invention makes possible the direct conversion of as much as about 25% of the sodium chloride originally present in the brine supplied to the operation to sodium sesquicarbonate and of as much as 50% or more of this sodium chloride to sodium bicarbonate. The maximum recovery of sodium sesquicarbonate is to be had by maintaining the brine subjected to the first carbonation substantially saturated with respect to sodium chloride, by maintaining the molecular ratio of $NH_3:NaCl$ in this brine close to 2:1, and by maintaining the reaction mixture at a temperature lower than 40° C., advantageously in the neighborhood of 30° C.

We claim:

1. In the production of sodium sesquicarbonate and sodium bicarbonate, the improvement which comprises carbonating an ammoniacal aqueous solution of sodium chloride containing upwards of 3.2 parts of $NH_3$ per 10 parts of NaCl, and substantially saturated with respect to NaCl, to precipitate sodium sesquicarbonate, separating the precipitated sodium sesquicarbonate at a temperature not exceeding about 40° C., carbonating the mother liquor to precipitate sodium bicarbonate, and separating the precipitated sodium bicarbonate.

2. In the production of sodium sesquicarbonate and sodium bicarbonate, the improvement which comprises carbonating an ammoniacal aqueous solution of sodium chloride containing about 4.4 parts of $NH_3$ per 10 parts of NaCl, and substantially saturated with respect to NaCl, to precipitate sodium sesquicarbonate, separating the precipitated sodium sesquicarbonate at a temperature approximating 30° C., carbonating the mother liquor to precipitate sodium bicarbonate, and separating the precipitated sodium bicarbonate.

3. In the production of sodium sesquicarbonate and sodium bicarbonate, the improvement which comprises carbonating an ammoniacal aqueous solution of sodium chloride containing upwards of 3.2 parts of $NH_3$ per 10 parts of NaCl, and substantially saturated with respect to NaCl, to precipitate sodium sesquicarbonate, separating the precipitated sodium sesquicarbonate at a temperature not exceeding about 40° C., bringing the ammonia concentration of the mother liquor to a value such that the ratio $NH_3:NH_3+Cl$ approximates 0.55, then carbonating the mother liquor to precipitate sodium bicarbonate, and separating the precipitated sodium bicarbonate.

4. In the production of sodium sesquicarbonate and sodium bicarbonate, the improvement which comprises carbonating an ammoniacal aqueous solution of sodium chloride containing about 3.2-7.0 parts of $NH_3$ per 10 parts of NaCl, and substantially saturated with respect to NaCl, to precipitate sodium sesquicarbonate, separating the precipitated sodium sesquicarbonate at a temperature not exceeding about 40° C., carbonating the mother liquor to precipitate sodium bicarbonate, and separating the precipitated sodium bicarbonate.

GEORGE LEWIS CUNNINGHAM.
HOMER LOUIS ROBSON.